No. 880,457. PATENTED FEB. 25, 1908.
K. KÖSZEGI.
MOTOR DRIVEN CULTIVATING MACHINE.
APPLICATION FILED FEB. 27, 1907.

4 SHEETS—SHEET 1.

WITNESSES

INVENTOR
Karl Köszegi

No. 880,457. PATENTED FEB. 25, 1908.
K. KÖSZEGI.
MOTOR DRIVEN CULTIVATING MACHINE.
APPLICATION FILED FEB. 27, 1907.

4 SHEETS—SHEET 2.

WITNESSES

INVENTOR
Karl Köszegi

No. 880,457. PATENTED FEB. 25, 1908.
K. KÖSZEGI.
MOTOR DRIVEN CULTIVATING MACHINE.
APPLICATION FILED FEB. 27, 1907.

4 SHEETS—SHEET 3.

WITNESSES
W. P. Burke

INVENTOR
Karl Köszegi

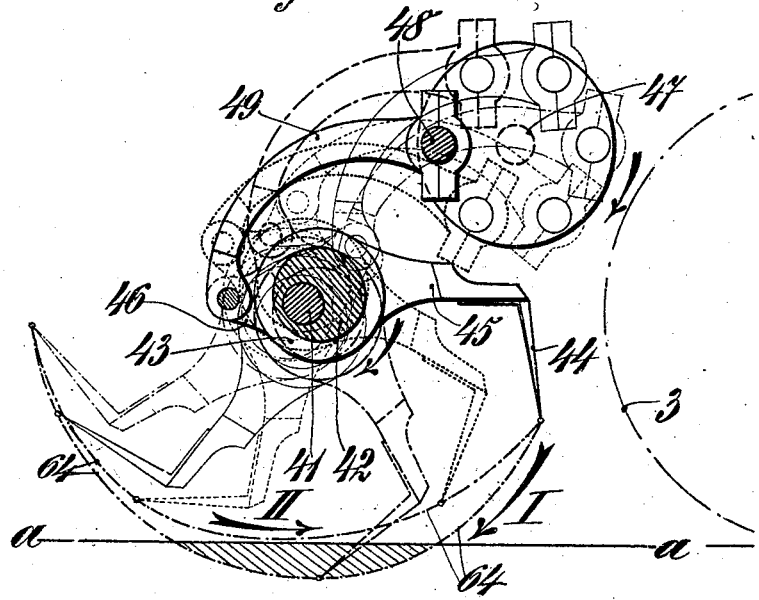
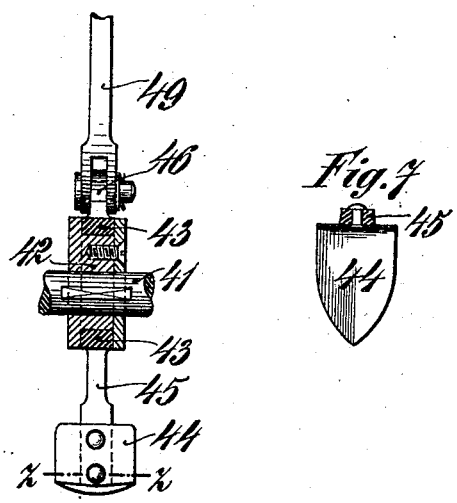

UNITED STATES PATENT OFFICE.

KARL KÖSZEGI, OF BAJA, AUSTRIA-HUNGARY, ASSIGNOR OF TWO-THIRDS TO JULIUS BÖHM AND SAMUEL GELB, OF BUDAPEST, AUSTRIA-HUNGARY.

MOTOR-DRIVEN CULTIVATING-MACHINE.

No. 880,457.  Specification of Letters Patent.  Patented Feb. 25, 1908.

Application filed February 27, 1907. Serial No. 359,626.

*To all whom it may concern:*

Be it known that I, KARL KÖSZEGI, subject of the Emperor of Austria-Hungary, residing at Baja, in the Empire of Austria-Hungary, have invented new and useful Improvements in Motor-Driven Cultivating-Machines, of which the following is a specification.

This invention relates to a motor-driven self-propelled cultivating and sowing machine, wherein a plow, harrow, ridge-drill and a roller are combined, and has for its object to completely cultivate the soil i. e. to loosen the soil and finally roll the sown seed in one single operation without the employment of beasts of draft. For the purpose of economizing power and more thoroughly cultivating the soil, the ordinary plowshares are replaced by a novel contrivance for hoeing up the ground, wherein crank operated hoes successively hoe the ground to any adjustable depth and completely turn up the same during the working of the machine but during the return of the engine, the cam controlled hoes are idle i. e. do not penetrate into the soil. This hoeing contrivance can be rendered operative or inoperative independently of the harrowing, sowing and rolling devices by means of suitable ratchet gear and vice versa the harrowing, sowing and rolling devices may also be rendered operative or inoperative simultaneously and independently of the hoeing contrivance and moreover all devices can be rendered operative simultaneously when the machine is to be started or they can be rendered inoperative when the motor only serves for propelling the machine in either direction.

Figure 1:
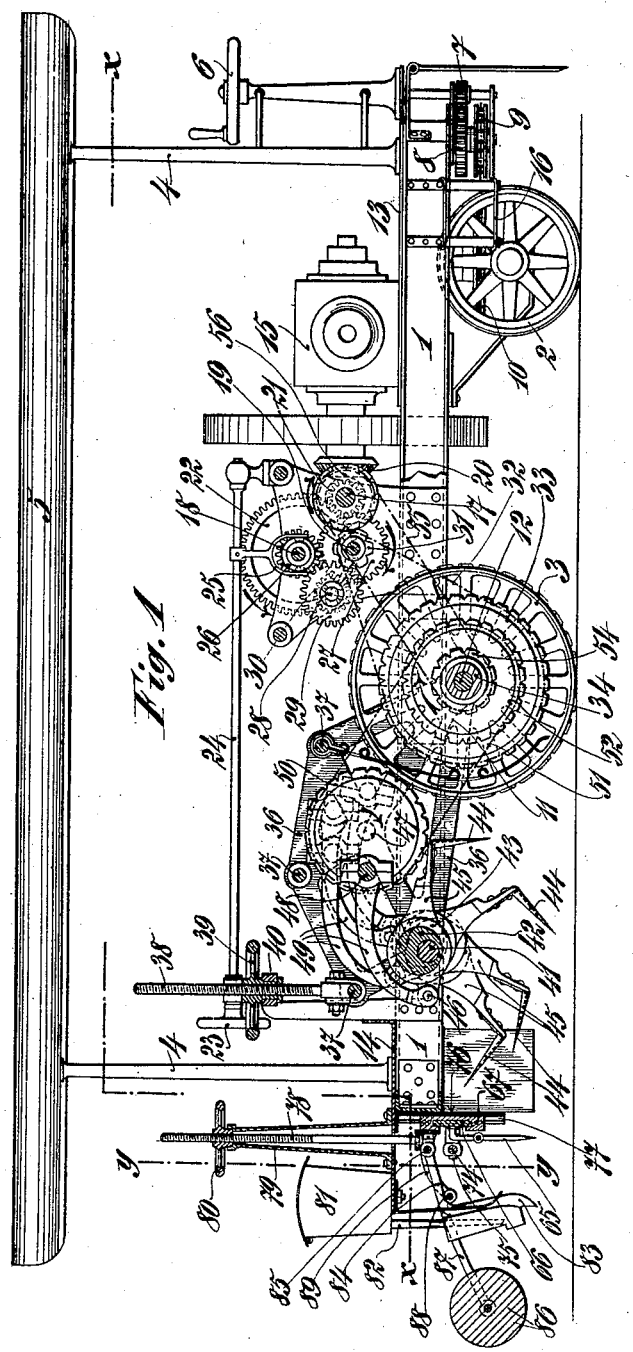
Figure 2:
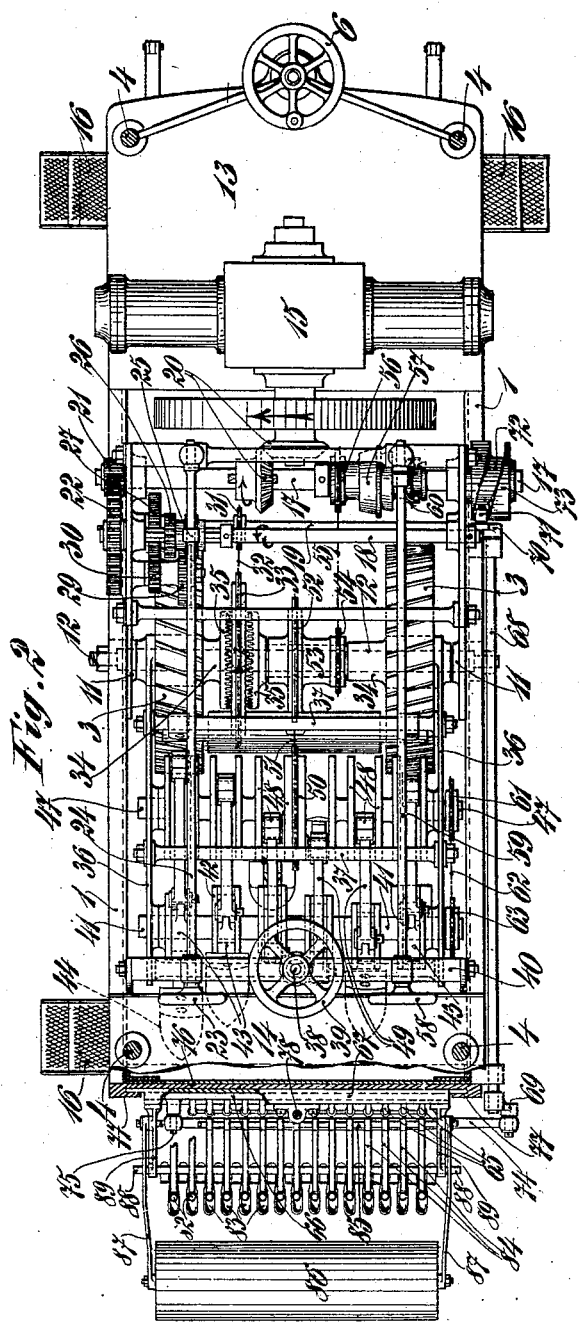
Figure 3:
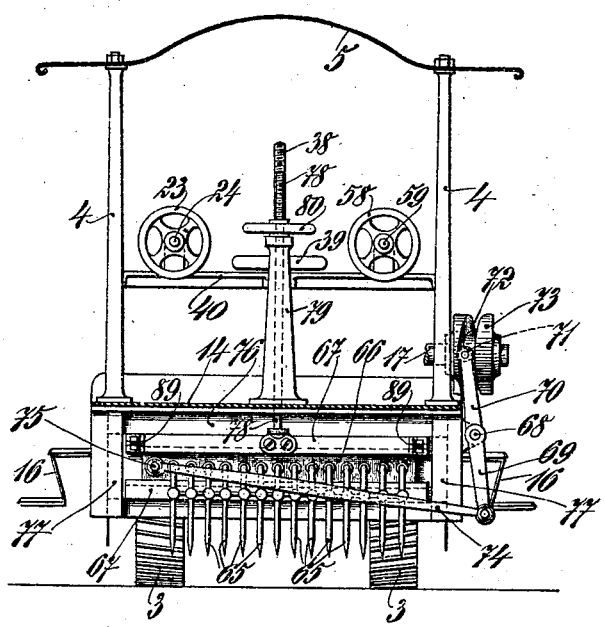
Figure 4:
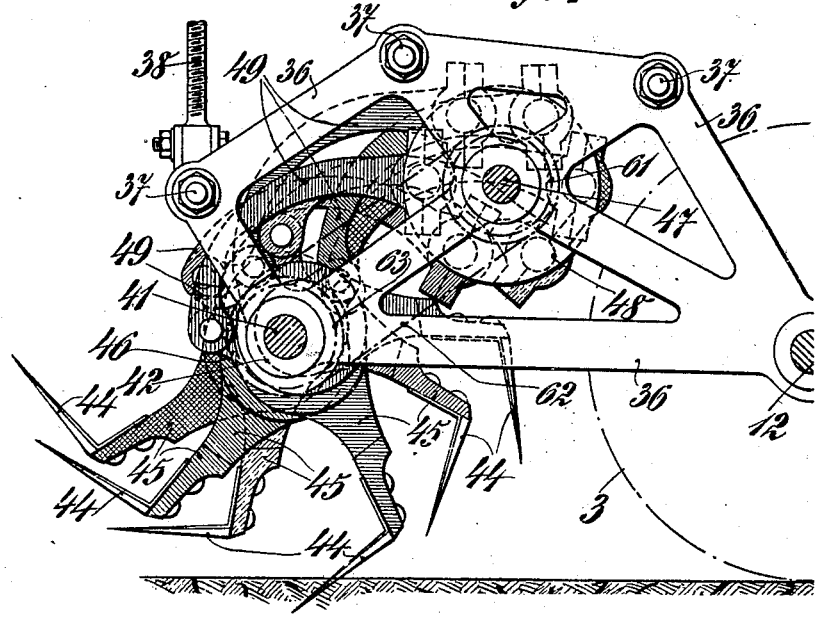

The accompanying drawings represent by way of example one constructional form of this machine. Figure 1 is a longitudinal vertical section through the machine; Fig. 2 is a section on line *x—x* in Fig. 1; Fig. 3 is a section on line *y—y* in Fig. 1; Fig. 4 is a side elevation of the hoeing contrivance on an enlarged scale; Fig. 5 shows the operation of one single hoe; Fig. 6 shows the rear view of a hoe and the vertical cross-section of the cam controlling the hoe and Fig. 7 is a section on line *z—z* in Fig. 6.

As shown in the accompanying drawing, the machine consists of a frame provided with a roof, the motor and all other devices being suitably arranged on the said frame. This movable frame constitutes an elongated horizontal iron frame 1 bearing on two pairs of wheels 2, 2 and 3, 3 respectively and supporting the roof 5 by means of the pillars 4. The front pair of smaller wheels 2, 2 can be turned to the right or left for the purpose of steering the machine by means of the hand wheel 6 and toothed gear 7, 8 and the chain gear 9, 10, while the rearward pair of larger wheels 3, 3 are rotatably mounted on an axle 12 fixed in bearings 11 (Fig. 2) on the frame 1. The front part of the frame 1 is in the form of a platform 13 and the rear part in form of a platform 14.

The motor 15 arranged on the platform 13 and the caster or rudder wheel 6 are operated from the platform 13 and the hoeing, harrowing, sowing and rolling contrivances as well as the ratchet and adjusting mechanisms are operated from the platform 14. Both platforms are accessible by means of steps 16. Three horizontal shafts 17, 18 and 19 for driving the machine are mounted in side standards or uprights attached to the frame 1 between the motor 15 and the pair of wheels 3, 3. The shaft 17 is operated from the motor 15 by the bevel gear 20 and causes the shaft 18 to move slower by means of the spur wheels 21 and 22. The shaft 18 carries a spur wheel 26 capable of a sliding movement from the platform 14 by means of the handwheel 23, adjusting shaft 24 and adjusting fork 25. The spur wheel 26 in one end position engages in a spur wheel 27 on the shaft 19 and rotates the shaft 19 in the direction indicated by an arrow and in the other end position, the spur wheel 26 engages in a reversing gear 29, 30 and drives the shaft 19 in the opposite direction, the said reversing gear being in permanent engagement with the toothed wheel 27 and loosely mounted on the stud 28 near the shaft 19. The spur wheel 26 does not engage with any part in the middle position and the shaft 18 then runs idle and the shaft 19 is stationary. Now the shaft 19 is connected by sprocket wheel gear 31, 32, 33 to the hollow shaft 34 of the wheels 3 which is loosely mounted on the stationary axis 12 and consequently, this pair of wheels 3 can be moved forwards or backwards from the shaft 19. The whole car may also be moved forwards or backwards when the wheel 26 of the shaft 18 is brought into either end position.

The sprocket wheel 33 of the sprocket wheel gear 31, 32, 33 is not rigidly connected with the hollow shaft 34 but coupled therewith (Fig. 2) after the manner of the differential gear known especially in connection with automobiles as the shaft 34 is divided and formed at the split ends into face wheels 35, wherein conical coupled toothed wheels engage, which are mounted in the usual manner in the sprocket wheel 33 loosely arranged between the face wheels 35. This construction has for its object to enable the wheels 3, 3 to make an independent relative rotation with respect to the turns of the machine and this construction may of course be replaced by any other construction answering the same purpose. The hoeing contrivance is arranged within the frame 1 between the pair of wheels 3, 3 and the rearward platform 14. This hoeing contrivance consists of a frame formed by two lateral vertical frames 36 and the transverse bars or rods 37 uniting the latter. The said frame is rotatably mounted at the front on the stationary axis 12 and through the instrumentality of a screw 38 and handwheel 39 the frame is adapted to move up and down rearwardly on a horizontal cross-beam 40 rigidly connected to the frame 1. For the aforesaid purpose, this screw 38 is linked with its lower end to the rearmost transverse bar 37 and mounted with its free end in the hand wheel 39, which is secured in the cross-beam 40 against axial displacement but can be easily rotated.

There is arranged in the rearward part of the said frame a horizontal shaft 41 which carries six cam disks 42 each being adjusted at an angle of 60°. Each disk 42 carries an eccentric ring 43 which is formed downwards into an arm 45 (Figs. 4, 5, 6) bearing a hoe 44 and upwards into an ear 46. A crank shaft 47 having six cranks adapted to turn at an angle of 60° is mounted in the frame between axis 12 and shaft 41. Now each crank 48 is coupled by a connecting rod 49 to an ear 46 of the eccentric rings 43. The crank shaft 47 carries a sprocket wheel 50 which is driven in the direction of the arrow (Figs. 1 and 2) by the chain 51 and the sprocket wheel 52 loosely mounted on the hollow shaft 34 of the wheels 3. The sprocket wheel 52 is rigidly connected by its hub 53 to a second sprocket wheel 54, which is driven by the chain 55 and the sprocket wheel 56 loosely mounted on the shaft 17, when this sprocket wheel 56 is coupled to the shaft 17 by means of the friction coupling 57 (Fig. 2). The coupling 57 as well as the toothed wheel 26 on the shaft 18 are operated by the adjusting fork 60 adapted to be actuated from the platform 14 by means of the handwheel 58 and the adjusting shaft 59. The crank shaft 47 adapted to be driven by the shaft 17 in the manner herein described is so connected to the cam shaft 41 by a sprocket wheel gear 61, 62, 63 or in any other suitable manner that both move with equal speed and in the same direction when the shaft 47 is driven. The hoes 44 derive from the rotating crank shaft 47 a pendulum oscillation vertical to the shaft 41 and imitating under the influence of the cams the manual labor when hoeing up the ground, because the cam disks 42 are so adjusted that the hoes when oscillating rearwards in the direction of the arrow I (Fig. 5) i.e. the working period during which they penetrate with their point into the ground and turn and hoe up the same, are guided by the cams in a lower path when oscillating forwards (direction of arrow II) but during the uneffective motion in a higher path in such a manner that the hoes do not come in contact with the earth. This is clearly obvious in Fig. 5 wherein six stages of the stroke of a hoe are shown and the curve 64 represents the path described by the point of the hoe, which path may of course be varied for any desired working depths by altering the eccentricity of the corresponding adjustable cams. The line a—a represents the soil and the shaded part cut away from the curve 64 through the said line represents the earth cultivated by the hoe. The upper part of the curve 64 represents the idle motion and the lower part the working motion of the hoe.

It is obvious that the hoes 44 only hoe and turn up the soil when the entire hoeing contrivance is correspondingly lowered by means of the described handwheel 39 i.e. turned downwards on the axis 12. A plate suspended to the foremost transverse bar 37 of the hoeing contrivance between the crank shaft 47 and the shaft 34 protects the latter and the wheels etc. thereon from the earth thrown up by the hoes.

The harrow which is adapted to be raised and lowered is located under the platform 14 behind the above-described hoeing contrivance. This harrow is a rake having downwardly directed vertical prongs 65, which are secured with their upper forwardly bent horizontal ends in a plate 66 which is capable of a horizontal sliding movement in a frame 67 in both directions and can also be caused to make a lateral oscillatory movement from the shaft 17 in the said frame 67. For this purpose, there is provided at the side of the frame 1 of the machine a horizontal shaft 68 (Figs. 2 and 3) which carries at the rearward end a downwardly directed arm 69 and at the front end an upwardly directed arm 70. The latter engages with a guide roller 71 in the peripheral groove 72 of a cam disk 73 keyed on to the shaft 17, said disk causing the shaft 68 to oscillate. The other arm 69 is coupled by a connecting rod 74 to a pivot 75 on the plate 66, so that the shaft 68 as well as the plate 66 are moved to and fro. The frame 67 guiding the said plate 66 is adapted to move up and down in lateral vertical guides 77 against a vertical transverse wall rearwardly shutting off the car frame under the platform 14 and is supported by a screw 78 which is mounted in a standard 79 arranged on the platform 14 and can be raised or lowered by means of the handwheel 80 in the form of a nut so that the frame 67 may be raised or lowered accordingly. If this frame 67 is lowered to such an extent that the points of the harrow prongs 65 touch the soil, the laterally oscillating prongs 65 which are also moved forward by the motion of the car harrow the earth which has been hoed up by the hoes 44 in a uniform rapid manner and thus make this earth ready for the reception of the seed.

There is arranged at the outermost end of the platform 14 the seed receptacle of any known ridge drill, from which the seed guide tubes 82 lead to the known sowing blades 83, the levers 84 of which are connected to a shaft 85 mounted above on the frame 67. There is also attached to the same shaft 85 the known roller 86 by means of lateral arms 87 and these arms as well as the levers 84 are supported by a horizontal bar 88 which is carried by the arms 89 connected to the shaft 85 and frame 67 (Figs. 1 and 2) so that when the latter is raised, not only the harrow 65 but also the plowshare levers 84 of the sowing machine and the roller 86 are raised and consequently rendered inoperative. If however the frame 67 is lowered to such an extent that the roller 86 rests on the ground, the plowshare levers 84 and the harrow 85 also penetrate into and cultivate the soil.

The manipulation and operation of the machine can now be readily understood from the preceding description. The machine may first of all be transported to the working spot by means of its own motor 15, for which purpose, the latter is only started when the hoeing, harrowing, sowing and rolling devices are raised and the toothed wheel 26 is in the middle position, whereupon when this wheel 26 is placed in either end position by means of the handwheel 23, the entire machine will move forwards or backwards by means of the chain gear 31, 32 and 33.

When the machine has arrived at the working place, it is brought into the proper working position i. e. with the platform 13 at the front and the wheel 26 is turned into the middle position, so that the machine is stationary but the motor is running. Now the hoeing contrivance is set in motion by means of the friction coupling 57 actuated by the handwheel 58 and is slowly lowered by means of the handwheel 39 and the screw 38 until the hoes 44 hoe and turn the earth to the necessary depth. When the hoeing contrivance is adjusted, the harrow, the sowing machine plowshare levers and the roller are lowered in the described manner by means of the handwheel 80 and the wheel 26 is coupled with the toothed wheel 27, whereupon the whole machine moves forward and hoes and turns up the earth, harrows the hoed and turned up earth, places the seed in the harrowed earth and simultaneously covers the seed by rolling.

Having now particularly described and ascertained the nature of my said invention and in what manner the same is to be performed, I declare that what I claim and wish to secure by Letters Patent is:—

1. A motor driven cultivating machine, comprising a shaft 41, hoes eccentrically mounted on said shaft at an angle, and means for successively oscillating said hoes, substantially as described.

2. A motor driven cultivating machine comprising a shaft 41, angularly disposed eccentrics mounted on said shaft, rings 43 mounted on said eccentrics, a hoe connected to each ring, a crank shaft 47, pitman rods connecting the cranks of said shaft with the rings 43 whereby said hoes will be successively operated on the rotation of the crank shaft, substantially as described.

3. A motor driven cultivating machine, comprising a main axle, a frame having one end swiveled thereon, means for engaging the other end of said frame for adjusting it vertically, a crank shaft 47 in said frame, means for driving the same, a shaft 41 also mounted in said frame, angularly disposed eccentrics 42 on said shaft 41, a ring 43 mounted on each eccentric, a hoe carried by each ring, and a pitman rod connecting each ring to a shaft on the crank shaft, whereby the hoes will be successively oscillated, substantially as described.

In testimony whereof I have signed my name to this specification in the presence of two subscribing witnesses.

KARL KÖSZEGI.

Witnesses:
 MARTIN HOENIGEY,
 CHARLES EDWARD ZATUM.